United States Patent [19]

Foeller

[11] 4,068,734
[45] Jan. 17, 1978

[54] AUTOMATIC VEHICLE SPEED LIMITING SYSTEM

[76] Inventor: James E. Foeller, 711 Mueller Road, Festus, Mo. 63028

[21] Appl. No.: 647,424

[22] Filed: Jan. 8, 1976

[51] Int. Cl.² .......................................... B60K 31/00
[52] U.S. Cl. ................................. 180/98; 180/105 E; 235/465; 250/567; 340/146.3 K
[58] Field of Search ............. 180/98, 105 E; 104/152; 235/61.11 E; 250/567; 340/146.3 K

[56] References Cited

U.S. PATENT DOCUMENTS

| | | | |
|---|---|---|---|
| 1,767,609 | 6/1930 | Murray | 180/98 X |
| 2,019,976 | 11/1935 | Huebscher | 180/98 X |
| 2,209,158 | 7/1940 | Goldsmith | 180/98 |
| 2,656,002 | 10/1953 | Keeton | 180/98 X |
| 2,996,137 | 8/1961 | Chu | 180/98 |
| 3,017,946 | 1/1962 | Davis | 180/98 |
| 3,085,646 | 4/1963 | Paufue | 180/98 |
| 3,332,406 | 7/1967 | Perry | 180/108 |
| 3,368,639 | 2/1968 | Deane | 180/108 X |
| 3,485,316 | 12/1969 | Slavin | 180/108 X |
| 3,668,624 | 6/1972 | Spaulding | 180/98 X |
| 3,727,046 | 4/1973 | Woods | 180/98 X |
| 3,895,684 | 7/1975 | Takeshi | 123/102 X |
| 3,941,202 | 3/1976 | Sorkin | 180/105 E |
| 3,952,829 | 4/1976 | Gray | 123/102 X |

Primary Examiner—Joseph F. Peters, Jr.
Assistant Examiner—John P. Silverstrim
Attorney, Agent, or Firm—Ralph W. Kalish

[57] ABSTRACT

A vehicle speed control system is disclosed. The system is carried by a vehicle for automatically controlling the vehicle speed in response to external light signals. First and second light detecting means, e.g. photodetectors, detect first and second types of light signals, respectively. These signals are preferably light reflected from different colored bands on a pavement over which the vehicle passes. The first type of signal representing a highest permissible speed limit for the vehicle, the second type representing a lower, predetermined speed limit. A speed governing means, preferably a solenoid-controlled vacuum governor, is selectively energizable for limiting the vehicle speed. Circuitry of the system is responsive to the second light detecting means for energizing the speed governing means thereby to limit the vehicle speed to the predetermined limit. This circuitry is responsive to the first light detecting means to deenergize the governing means, thus permitting highest permissible speed of the vehicle. As a method of controlling vehicle speed in response to external light signal, the disclosure contemplates detecting a light signal representing the predetermined speed limit, converting this detection into a digital number representative of the speed limit, generating a speed signal representative of the vehicle's actual speed, and electronically comparing the digital number with the speed signal. Finally, the method involves limiting the speed of the vehicle propulsion motor if the speed signal incipiently exceeds the digital number.

7 Claims, 2 Drawing Figures

AUTOMATIC VEHICLE SPEED LIMITING SYSTEM

BACKGROUND OF THE INVENTION

The present invention relates to systems for automatically controlling the speed of a vehicle and, more particularly, to systems for automatically limiting speed of a vehicle in response to external signals.

The crowding of highways, the need for conservation of full, and increasing concern for safety, have emphasized the importance and desirability of rigidly enforcing the observation of vehicle speed limits in general.

Moreover, there has been a long-felt need to provide a way of ensuring that drivers of vehicles observe reduced speed limits in situations or locations where their operation of vehicles in excess of speed limits constitutes a clear and present danger to themselves, occupants of other vehicles, or pedestrians. Operation of vehicles in conditions of reduced visibility, in crowded municipalities, or in school zones, mandates reduced speeds. Yet, safety statistics illustrate that voluntary compliance with posted speed limits is often unsatisfactory in such situations.

Accordingly, it is believed desirable to be able to automatically limit vehicular speed under certain circumstances. Many proposals have been made heretofore for systems which limit speed. For example, Huebscher U.S. Pat. No. 2,070,432 discloses a system for controlling the speed of a vehicle in which the driver is constantly advised by colored lights or marks of the maximum speed he is permitted to travel in a given zone. This Patent also discloses that a governor on the vehicle may then be set by the operator to maintain a speed according to the colored code. This system requires the voluntary cooperation of the driver.

Ferrill U.S. Pat. No. 2,493,755 describes a system for vehicle speed control involving photoelectric sensing of a continuous series of reflective speed control strips embedded in a pavement. This system requires the continuous periodic presence of such strips for speed control purposes since the spacing between strips establishes the speed limit.

Sampey U.S. Pat. No. 3,642,087 is another disclosure of a system for maintaining vehicle speed in response to photoelectric detection. Similarly, this system controls speed in accordance with the spacing between reflective pavement elements and also requires the continuous periodic presence of such strips for speed control to be maintained. A similar concept is taught by Lambert U.S. Pat. No. 3,353,619.

There have been numerous other disclosures of speed control systems using either passive or active transmission of radiant energy to a vehicle for the purpose of controlling its speed or alerting a driver to a speed limit. The prior art "active" systems (where a transmitter beams some form of radiant energy to signify a speed zone) there are inherent disadvantages, such as high cost of installation, complexity, and need for costly maintenance. In prior art "passive" systems (where spaced passive reflective, magnetic, or radioactive elements are detected by apparatus carried by a vehicle) disadvantages include high costs of installation and maintenance due to large numbers of elements. Another disadvantage is the difficulty of changing the speed limit in a zone, again resulting from the use of large numbers of elements or the requirement that they have a predetermined spacing.

SUMMARY OF THE INVENTION

It is an object of the present invention to provide apparatus and methods for automatically controlling the speed of a vehicle by the use of light-producing elements associated with the roadway over which the vehicle passes, said elements determining a speed limit for the vehicle.

A further object of the present invention is to provide apparatus and methods of vehicle speed control wherein the light-producing elements may be either passive or active but may be relatively few in number as compared with prior art passive systems and which readily permit changing a speed limit in a zone.

A still further object of the invention is the provision of such apparatus and methods of vehicle speed control providing low cost of installation, simplicity of construction, and operation, and requiring relatively little maintenance.

Another object of the invention is the provision of such apparatus and methods of vehicle speed control wherein the length of a speed control zone may be indeterminate or of any desired length without varying the number of light-producing elements which determine the speed limit in the zone.

Briefly, an automotive vehicle speed control system of the present invention is adapted for being carried by a vehicle for automatically controlling the speed of the vehicle in response to external light signals. The system comprises first and second means for optically detecting a first color signal, and a second color signal, respectively. The system includes a digital counter and means for resetting the digital counter in response to each optical detection of the first color signal. Means is provided for causing the digital counter to count in response to each optical detection of the second color signal. Thus, the counter counts to a number corresponding to a speed limit for the vehicle. Means is included for converting the count in the counter to an analog reference signal and for supplying said analog reference signal to the governor. A speed governing means limits the speed of the vehicle to a speed limit corresponding to the value of the analog reference signal. Accordingly, the speed governing means limits the speed of the vehicle to said speed limit. The resetting of the counter has the effect of permitting the vehicle to be operated at a highest permissible speed.

As a method of controlling the speed of a vehicle in response to external light signals the invention involves detecting a light signal representing a predetermined speed limit for the vehicle, converting the detecting of said light signal into a digital number representative of said predetermined speed limit, and generating a vehicle speed signal representative of the actual speed of the vehicle. The digital number is then electronically compared with the speed signal. The speed of a motor for propelling the vehicle is automatically limited if the speed signal incipiently exceeds the digital number, limiting the vehicle speed substantially to the predetermined speed limit.

DESCRIPTION OF THE PREFERRED EMBODIMENT

Figure 1:
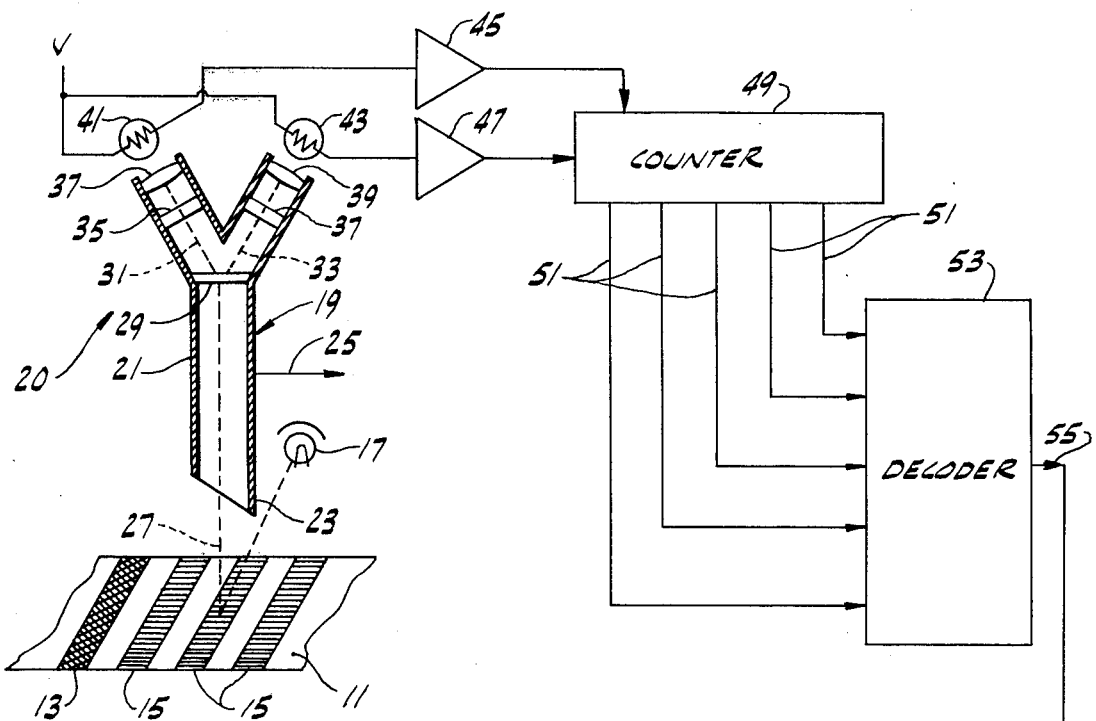
FIG. 1 is a diagram, partly schematic and partly in block form, illustrating the present vehicle speed control system.
Figure 1:
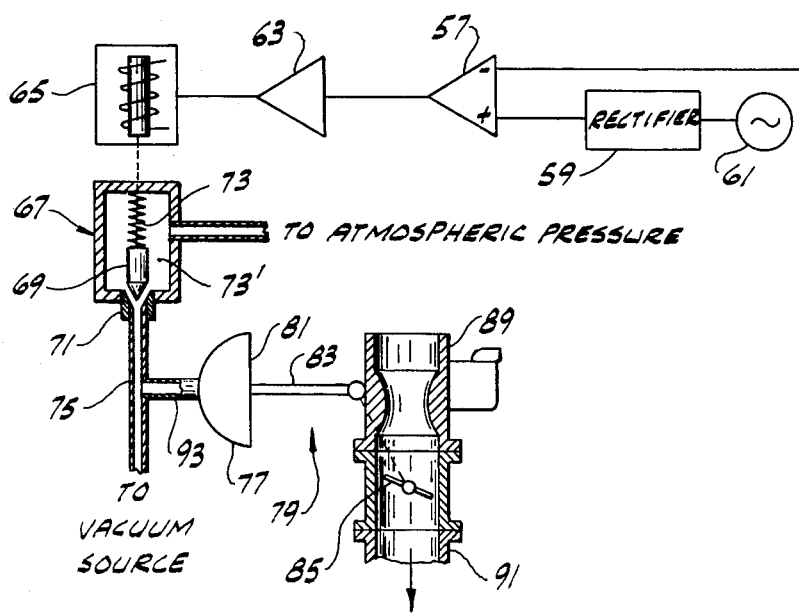

Referring to FIG. 1, at 11 is represented a section of pavement of a highway or other roadway over which a vehicle such as an automobile (not shown) is traveling. The pavement 11 is shown as having suitably applied thereto a color stripe or band 13 of a first color, such as red, and a predetermined number (such as three) of color stripes or bands 15 of a different second color, such as green.

The areas of the color bands 13 and 15 are preferably of a reflective nature, such that when illuminated by a light source 17, they will brightly reflect a beam of light of their respective colors to an optical assembly indicated generally at 19, and which is carried by the vehicle. The vehicle is here considered for purposes of explaining the invention as being an automobile, although it will become apparent that the invention is applicable to controlling the speed of various types of vehicles driven by a propulsion motor capable of being governed from within the vehicle.

Optical assembly 19, as well as the remaining components or elements shown interconnected with assembly 19, are carried by the automobile. Assembly 19 forms part of an optoelectronic light signal detecting means generally designated 20. Assembly 19 includes a tube 21 mounted vertically on the automobile with the lower end 23 thereof positioned over the pavement such that light is reflected from the color bands as colored beams directed into tube 21 as the vehicle moves in the direction indicated by an arrow 25. Accordingly, when the first or initial band 13 (which is hereinafter assumed to be red for purposes of illustration) is passed by the lower end 23 of tube 21 as the vehicle travels over pavement 11, red light is initially beamed into tube 21. Then, passage of each subsequent color band 15 (hereinafter assumed to be green) causes green light to be beamed into tube 21. A typical reflected light ray is designated 27.

For the foregoing purposes, it should be clear that light 17 may either be carried by the automobile or positioned over or adjacent the pavement. Alternatively, bands 13 and 15 may be areas of a translucent nature with the light source 17 having a position below these areas.

It is also conceivable that various forms of individual colored lights or bulbs, etc. may provide areas of colored light serving the requirements of the invention. These need not necessarily be placed on or within pavement 11, but may instead be placed adjacent the pavement in a position from which they may beam light into tube 21, the latter being suitably oriented for this purpose, of course. In any event, the ray or beam 27 passes through the bore of tube 21 where it strikes a diffuser or suitable beam splitter 29 and is thereby divided into separate rays 31 and 33 which pass through respective conventional color filters 35 and 37. The filtered rays are then focused by lenses 39,39' onto respective photocells 41 and 43. These are shown as being of a photoresistive nature. The filtering characteristics of the filters 35,37 is such as to cause discrimination between the two different colors. Accordingly, each of the photocells will only respond to or detect one of the two colors. Photocell 41 thus responds only to a beam of red light from red band 13 and photocell 43 thus responds only to a beam of green light from one of the green bands 15.

From the foregoing, it will now be seen that the photocell arrangement provides first and second light detecting means adapted to detect passage on the pavement of areas of first and second colors. Passage of the first band of color, red, provides a red beam constituting a first type of color signal representing a highest permissible speed for the automobile. Passage of each subsequent green color band provides a second type of color signal, each green band representing a speed limit increment.

To further illustrate, passage of the initial red stripe 13 signals a maximum speed of, for example, 70 mph, or an unlimited, full-throttle speed, as a further example. Passage of each green stripe 15 signals an incremental reduction, such as 10 mph, of the speed limit for the vehicle in a zone. For example, a single green band may signal or represent a 60 mph speed limit; two green bands may represent a 50 mph speed limit, and so forth. Passage of each of the color bands 13 or 15 is optoelectronically sensed or detected by the resulting decrease in resistance of the corresponding photocells 41 or 43, each of which has a suitable potential V applied to one side thereof. Such decrease in resistance provides a pulse or signal to a corresponding amplifier 45 or 47. The output of amplifier 45 is interconnected with the reset input of a digital counter 49, while the output of amplifier 47 is interconnected with the clock or "count" input of counter 49.

Accordingly, each time a red band is passed, the resultant pulse will reset counter 49, and each time a green band is passed, the resultant pulse will increase the count in the counter by one, beginning from zero. The count therefore corresponds inversely to a predetermined speed limit for the automobile. The counter 49 may be of a binary, decimal or other type, but is herein described as being binary in nature. It has outputs collectively designated at 51 which represent the count in the counter. These outputs are interconnected with inputs of a suitable decoder 53.

The decoder may be a digital-to-analog converter so that it decodes the count in counter 49 to provide at the decoder output 55 an analog signal constituting a speed reference signal. The magnitude of this signal represents a predetermined speed limit for the automobile and is supplied to the inverting input of a voltage comparator 57.

The comparator compares the speed reference signal with a vehicle speed signal. This latter signal is supplied to the noninverting input of comparator 57 by a rectifier 59 which rectifies the output of an a.c. tachometer generator 61 driven by the automobile at a speed which is directly proportional to the actual speed of the automobile. For example, tachometer generator 61 may be driven by a wheel or by the transmission of the automobile.

The comparator 57 provides an output signal of positive polarity only when the vehicle speed signal exceeds the analog reference signal. This output signal is amplified by an amplifier 63 and supplied to a solenoid 65. The latter controls a bleed valve assembly 67 having a valve 69 normally biased against a seat 71 by a spring 73 located within a valve chamber 73'. When the solenoid is energized, valve 69 is raised from its seat to permit air at atmospheric pressure to pass from the valve chamber 73' into a conduit 75 communicating with a diaphragm chamber 77 of a governor assembly generally designated 79.

The governor assembly has a diaphragm 81 to which a butterfly valve actuating linkage 83 is secured. This linkage controls the position of a butterfly valve 85 in a governor body 87 positioned between a carburetor 89 and the engine intake manifold 91. Reduced pressure from a vacuum source connected to conduit 75, such as a pump or the engine intake manifold, normally urges diaphragm 81 in a direction tending to close butterfly valve 85 for reducing the speed of the engine. It may be noted that a suitable orifice 93 restricts movement of air to or from the diaphragm chamber 75 in order to smooth the governing action or response of this speed governing assembly.

It may, of course, be desirable to provide means of quickly opening butterfly valve 85 in an emergency. This may be accomplished, for example, by a suitable linkage responsive to full-throttle operation of carburetor 89.

Figure 2:
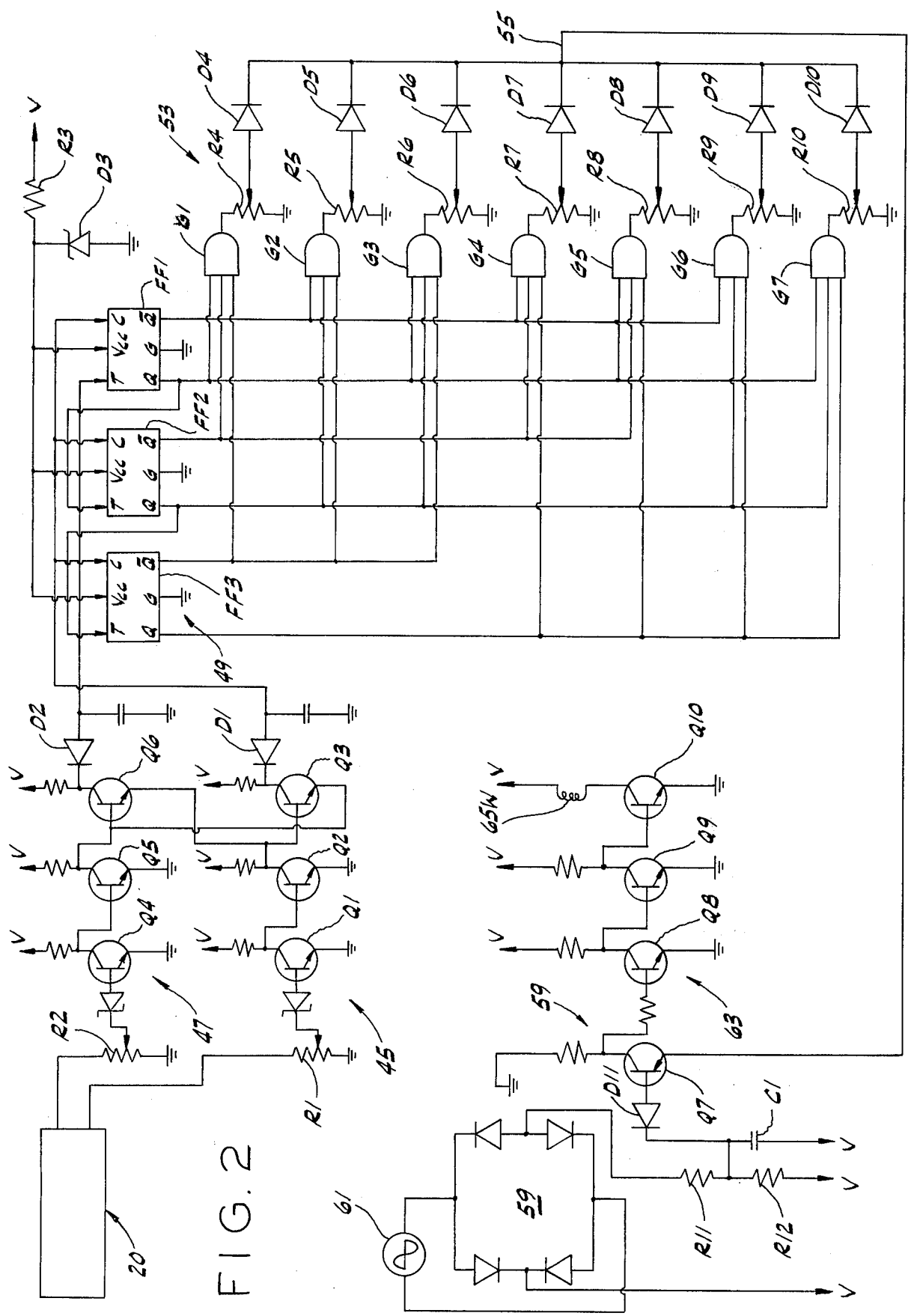
FIG. 2 is a detailed circuit diagram illustrating portions of circuitry of the system.

Specific circuitry of the preferred embodiment is shown in FIG. 2 wherein the optoelectronic light signal detecting means 20 (shown in detail in FIG. 1) is represented in block form.

Here the amplifier 45 is seen to comprise cascaded NPN transistors Q1, Q2, and Q3. Similarly amplifier 47 comprises cascaded NPN transistors Q4, Q5, and Q6. Each of the amplifiers may be calibrated for resistivity by adjusting a respective potentiometer R1 or R2. The output of amplifier 45 is interconnected by a diode D1 with the reset or "clear" input marked "C" of each of three flip-flops FF1, FF2, and FF3. The output of amplifier 47 is interconnected by a diode D2 to the count ("clock") or toggle input, marked "T" of flip-flop FF1.

Flip-flops FF1, FF2, and FF3 constitute counter 49. It will be apparent that these flip-flops are connected in a binary counting chain, with the Q output of the first interconnected with the toggle input of the second, and so forth. A suitable d.c. voltage, such as 5 v.d.c. for the flip-flops or other devices is provided from a voltage-regulating circuit comprising a zener diode D3 and current-limiting resistor R3 to which the vehicle battery or other power source V is connected. This may be a 12 v. source as is conventional.

Decoder 53 comprises a plurality of 3-input AND-logic gates G1–G7 having their inputs interconnected as shown with corresponding Q and Q outputs of flip-flops FF1–FF3. Potentiometers R4–R10 are connected across the outputs of the respective AND gates G1–G7 in order to calibrate the speed limiting reference potential represented by the active output of each such gate. Corresponding isolation diodes D4–D10 connect the wipers of these potentiometers to a common lead serving as the output 55 of the decoder.

This lead is connected to the emitter of an PNP transistor Q7 connected to serve as comparator 57. It will be noted that the output of rectifier 59, here shown as a diode bridge, is provided to a voltage divider comprising resistors R11 and R12 which, in conjunction with a capacitor C1 connected through a diode D11 to the base of Q7, establish a circuit for biasing Q7 into conduction or out of conduction depending upon whether the potential representing the output voltage of tachometer generator 61 exceeds the analog speed reference signal provided on lead 55. When the vehicle speed reaches the speed limit represented by the signal on lead 55, transistor Q7 is rendered conductive. The collector of this transistor is supplied to amplifier 63, which is seen to consist of three cascaded NPN transistors Q8, Q9, and Q10. The winding 65W of solenoid 65 is shown connected in the collector-emitter circuit of transistor Q10.

Operation of the system accordingly involves a method of vehicle speed control in response to light signals external to the vehicle involving use of optoelectronic means 20 to photodetect a first type of light signal representing a highest permissible speed for the vehicle and a second type of light signal representing a lower predetermined speed limit.

The second type of light signal, i.e., the detected passage of green bands 15, is converted by the binary counter 49 into a digital number representative of the predetermined speed limit. Since the counter retains its count until reset by the subsequent detection of a red band 13, it stores this digital number indefinitely.

The potential for operating flip-flops FF1-FF3 is preferably supplied independently of the operation of the automobile ignition switch. This prevents the vehicle operator from interferring with the number stored in the counter and thus ensures that the speed limiting operation of the system will not be prevented by operator action or, for example, by stopping the automobile while within a speed limit zone. The stored number is converted by decoder 53 to an analog speed reference signal. This is electronically compared by comparator 57 with the d.c. vehicle speed signal resulting from operation of tachometer generator 61. The output of comparator 57 thereby represents a speed control signal which is a function of the difference in values of the d.c. speed signal and the analog speed reference signal. The speed control signal is amplified by amplifier 63 in order to selectively energize solenoid 65, controlling the vacuum which operates the governing apparatus 79. Hence, the speed control signal effects the limiting of the speed of the automobile engine and thereby limits the automobile's speed to the predetermined speed limit.

It will be noted, of course, that subsequent detection of a red band resets the counter and once again permits the automobile to be driven at its highest permissible speed. This has the effect of terminating the automatic limiting of the automobile's speed to the predetermined speed limit. However, it should be observed that it may be desirable to use the present system to automatically limit speed of the automobile to a highest permissible speed less than the intrinsic top speed of the automobile.

The invention thus has the advantage of permitting speed limiting action to be initiated automatically at the beginning of a speed limit zone. This speed limiting operation continues throughout the zone until a red band is detected. Another advantage is that the speed limit may be easily and gradually reduced by small degrees since each additional green stripe reduces the speed of the vehicle by an increment.

In view of the foregoing, the several objects of the invention are seen to be achieved and other advantages are also attained.

Since various changes could be made in the above apparatus and methods without departing from the scope of the invention, it is intended that all matter contained in this description, including the accompanying drawings, shall be interpreted as illustrative and not in a limiting sense.

Having described my invention, what I claim and desire to obtain by Letters Patent is:

1. An automotive vehicle speed control system for being carried by a vehicle for automatically controlling the speed of the vehicle in response to external light signals, said system comprising:
   means for optically detecting a first color signal;
   means for optically detecting a second color signal;
   a digital counter;
   means for resetting the digital counter in response to each optical detection of the first color signal;
   means for causing the digital counter to count to a number corresponding to the number of optical detections of the second color signal, the count number representing a speed limit for the vehicle;
   means for converting the count in the counter to an analog reference signal;
   speed governing means for limiting the speed of the vehicle to a speed limit corresponding to the value of said analog reference signal; whereby the speed governing means limits the speed of the vehicle to said speed limit.

2. A vehicle speed control system as set forth in claim 1 wherein the counter when reset has a count corresponding to a highest permissible speed limit for the vehicle.

3. A vehicle speed control system as set forth in claim 2 wherein the count corresponding to a highest permissible speed limit for the vehicle is count of zero and each count increasing from zero corresponds to an increment of speed limit reduction, the count in the counter having an inverse correspondence to the speed limit for the vehicle.

4. A vehicle speed control system as set forth in claim 1 wherein:
   said means for optically detecting a first color signal comprises first photocell means responsive to passage of the vehicle over a color band of a first color and a pavement constituting a roadway for the vehicle; and
   said means for optically detecting a second color signal comprises second photocell means responsive to passage of the vehicle over a color band of a second color on said pavement, said second color being different from said first color.

5. A vehicle speed control system as set forth in claim 4 further comprising optical means positioned on the vehicle over said pavement for receiving light transmitted from said color bands on the pavement, said optical means including first light filter means for permitting substantially only light of said first color to be supplied to said first photocell means and second light filter means for permitting substantially only light of said second color to be supplied to said second photocell means.

6. A vehicle speed control system as set forth in claim 5 wherein said optical means is adapted for receiving a beam of light reflected from said color bands on the pavement and includes provision for directing rays of said beam to each of said photocell means.

7. A vehicle speed control system as set forth in claim 1 wherein said speed governing means comprises:
   means for providing a vehicle speed signal the magnitude of which varies as a function of the speed of the vehicle;
   signal comparing means for comparing the vehicle speed signal to said analog speed reference signal; and
   means, responsive to the signal comparing means, for varying the speed of the vehicle in a sense tending to prevent said vehicle speed signal from exceeding said analog speed reference signal.

* * * * *